R. S. WHEELER.
COTTON PICKER.
APPLICATION FILED MAY 20, 1908.
922,647.
Patented May 25, 1909.
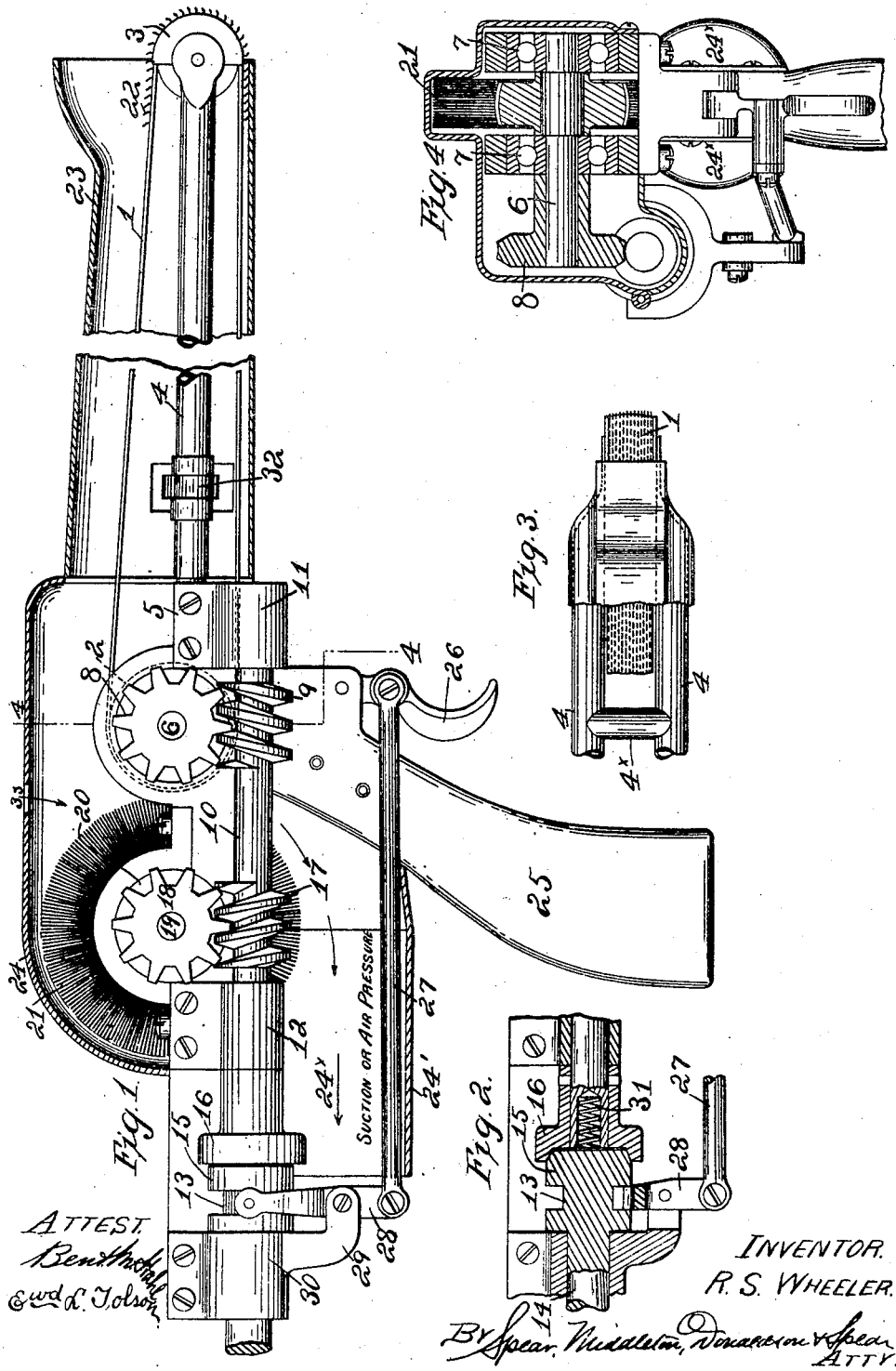
ATTEST.
INVENTOR.
R. S. WHEELER.

UNITED STATES PATENT OFFICE.

ROBERT S. WHEELER, OF NORRISTOWN, PENNSYLVANIA.

COTTON-PICKER.

No. 922,647.  Specification of Letters Patent.  Patented May 25, 1909.

Application filed May 20, 1908. Serial No. 433,985.

*To all whom it may concern:*

Be it known that I, ROBERT S. WHEELER, a citizen of the United States, residing at Norristown, Pennsylvania, have invented certain new and useful Improvements in Cotton-Pickers, of which the following is a specification.

My invention relates to cotton picking machines, and my object is to provide a machine in which the picker device will be driven by power but under the complete control of the operator, it being possible to have a plurality of individual picker devices to be carried in the hands of a number of attendants and all driven from the same machine and each under individual control.

In carrying out my invention I connect the picker devices with the main driving machine through flexible shafting, and these picker devices are also combined with pipe or conduit connections through which the cotton will be drawn by suction from the picker devices to a central point for collection or storage.

My invention consists in the features and combination and arrangement of parts hereinafter described and particularly pointed out in the claims.

In the accompanying drawings—Figure 1 is a part sectional and part side elevation of the picker device; Fig. 2 is a sectional view of a detail; Fig. 3 is a plan view of a detail; and Fig. 4 is a cross sectional view substantially on the line 4—4 of Fig. 1 with parts in elevation.

In these drawings 1 indicates a belt passing around pulleys 2, 3, the pulley 3 being journaled at the outer end of a rod or bar 4 which is supported from a bracket 5 and the pulley 2 being carried by a shaft 6 held in suitable bearings 7 of the frame work. The shaft 6 carries also fixed thereto a worm wheel 8 meshing with the worm 9 on the shaft 10 journaled at 11, 12 in the main framework, this shaft being driven through a clutch 13 from a stub shaft 14 with which may be connected, in any suitable manner, any desired form of flexible shafting. The clutch 13 has a cone portion 15 thereon engaging the cup shaped portion 16 fixed to the shaft 10. On this shaft is also fixed a worm 17 engaging a worm wheel 18 on the shaft 19 journaled in bearings 20, said shaft carrying thereon a brush 21, the bristles of which are arranged to work in proximity to the surface of the belt 1. This belt is provided with teeth 22 similar to card clothing and adapted to engage the cotton and remove the same from the plant. The bracket or rod 4 together with the belt 1 are inclosed within an extension casing 23, this extension casing reaching out from the main casing 24 supported on the main frame work of the device. This main frame work is designed to be carried in the hand of the attendant, for which purpose it is provided with a grip 25 like that of a revolver, and pivoted to this grip is a finger piece 26 in convenient position to be grasped by the finger like the trigger of a revolver, the said finger piece being connected by a rod 27 with a lever 28 pivoted to a bracket 29 extending from the bearing 30 in which the stub shaft 14 is journaled. The clutch member 13 is grooved circumferentially and receives a forked portion of the lever 28. The end of the shaft 10 is socketed and in this socket a spring 31 is located bearing against the face of the clutch member 15.

In the operation of the invention the operator, by grasping the hand-hold 25 can direct the instrument in any way among the plants to engage the points of the belt with the cotton. At this time the belt is at rest, and by simply operating the finger piece or trigger 26 the belt will be set in motion through the operation of the described connections owing to throwing the clutch members 15, 16 into driving contact. It will be noticed that both the belt and the brush are driven from the same shaft 10 and for this purpose in order to give these parts a proper direction of movement the worms 9 and 17 are of reverse order in respect to each other. The belt will be driven so long as the trigger or finger piece 26 is pressed, but immediately this is released the spring 31 will throw out the clutch members and stop the transmission of power from the stub shaft 14 to the belt and clearer wheel 21, and it will thus be clear that the picking of the cotton, while done by power, will be practically as much under the individual control of the operator as in hand picking. He can stop and start the belt at any moment and the serious objection heretofore existing to mechanical picking devices may be avoided, namely: the mingling with the picked cotton of leaves, twigs, and other foreign matter, for it will be noticed that the operator need not start the machine in operation until he has applied it to the desired point on the plant and directly in contact with the cotton. The function of the brush wheel 21 is to clear the belt from the cotton and the operation of this brush wheel is such that the bristles move longitudinally of the points 22. I may provide any suitable means at 32 for adjusting the bar 4 to get the desired tension on the belt 1.

It will be observed that the casing 23 and the main casing 24 completely inclose the brush and belt, and I provide a further extension of this casing at 24' which forms a conduit 24× below the brush or clearer which may be connected in any suitable manner with a suction pipe through which the cotton which is cleared from the belt by the clearer device will be drawn into any suitable receptacle.

The bar or rod 4 is formed of tubing in two pieces and this tubular construction is true also of the cross brace 4×, Fig. 3. The tubing 4 fits over rounded ends or projections on the main frame and these tubular portions are slipped to adjust the belt by the nut and lock device 32. The belt can be adjusted without taking off the casing 23. An opening is provided in the casing 23, through which the nut 32 may be reached. The casings 23 and 24 inclose the brush and belt and all the moving parts of the device, namely, the shaft 10, worm wheels 8 and 18, and clutch 13.

While I use air to drive the cotton through the conduit I do not use suction to pick or in any way disturb the cotton from the plant, nor do I depend upon it to free the brush 21.
There must be no suction at the end of the picker and in order to prevent this I provide an opening or openings at 33 through the case 24 to admit sufficient air so as to prevent all suction at the picker end. I may employ a jet or jets of air introduced into the conduit 24×, said jets pointing backward and causing sufficient draft to carry the cotton away from the brush and belt. These jets are placed as far back in the conduit 24× as possible. The air entering through the hole or the jets in the neighborhood of the opening 33 will help to clear the brush, but the main reliance for this purpose is the centrifugal force due to the revolution of the brush.

I claim—

1. In combination in a cotton picking apparatus, a belt having points thereon for engaging and dislodging the cotton from the plant, a casing inclosing the said belt, and pneumatic means applying its power at the rear end of the belt or at a point removed from the front end where the cotton is dislodged so that said end will be relieved from the action of the pneumatic means, substantially as described.

2. In combination in a cotton picking apparatus, a belt having points thereon to engage the cotton, a brush or wheel to remove the cotton from the belt, a casing inclosing the said parts, and pneumatic means applying air pressure or suction at the point adjacent the rear end of the belt and the brush wheel for carrying the cotton away therefrom while relieving the front end of the belt from air pressure or suction, substantially as described.

3. In combination a casing, a shaft mounted therein, a belt, with pulleys supporting the same, mounted in said casing, means for driving the belt from the shaft, a clutch controlling the said shaft, a hand grip extending downwardly from the casing, a trigger at the front of said hand grip and a rod extending rearwardly from the said trigger to the clutch, substantially as described.

In testimony whereof, I affix my signature in presence of two witnesses.

ROBERT S. WHEELER.

Witnesses:
JOHN J. CORSON,
HENRY F. CORSON.